United States Patent Office 3,452,827
Patented July 1, 1969

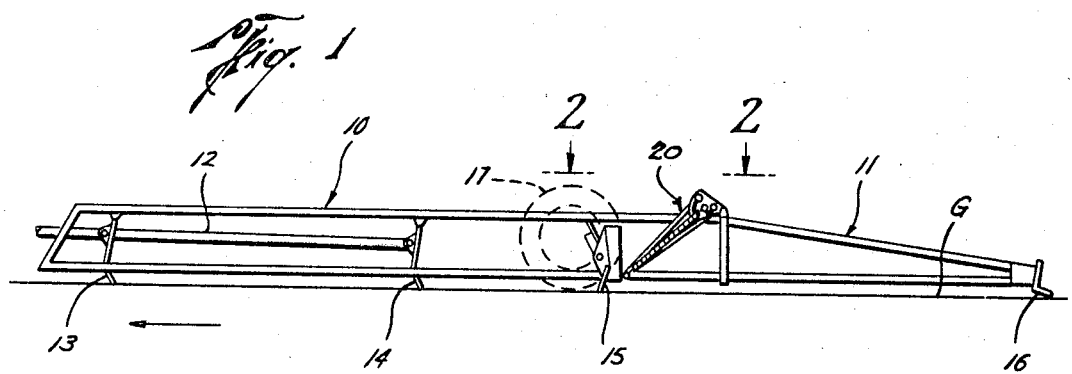
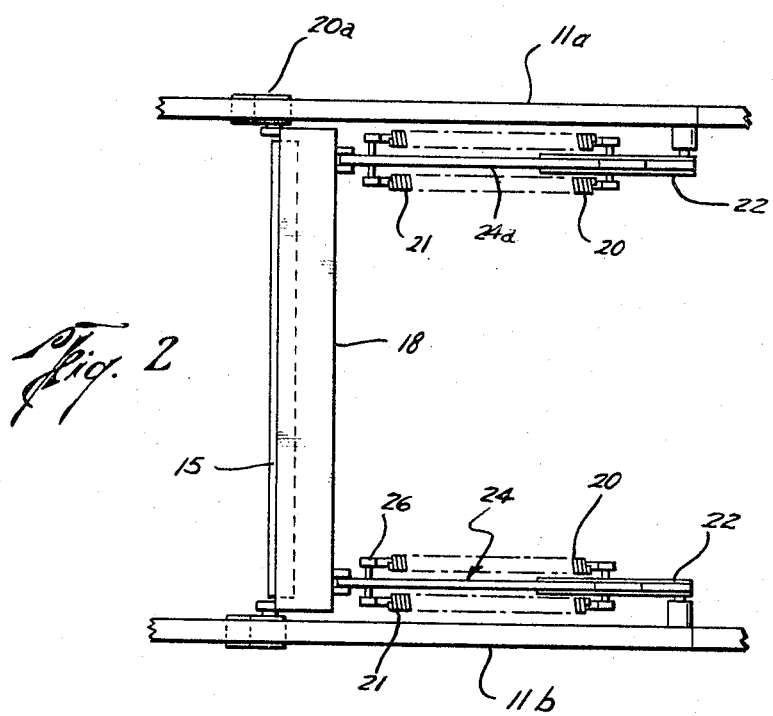

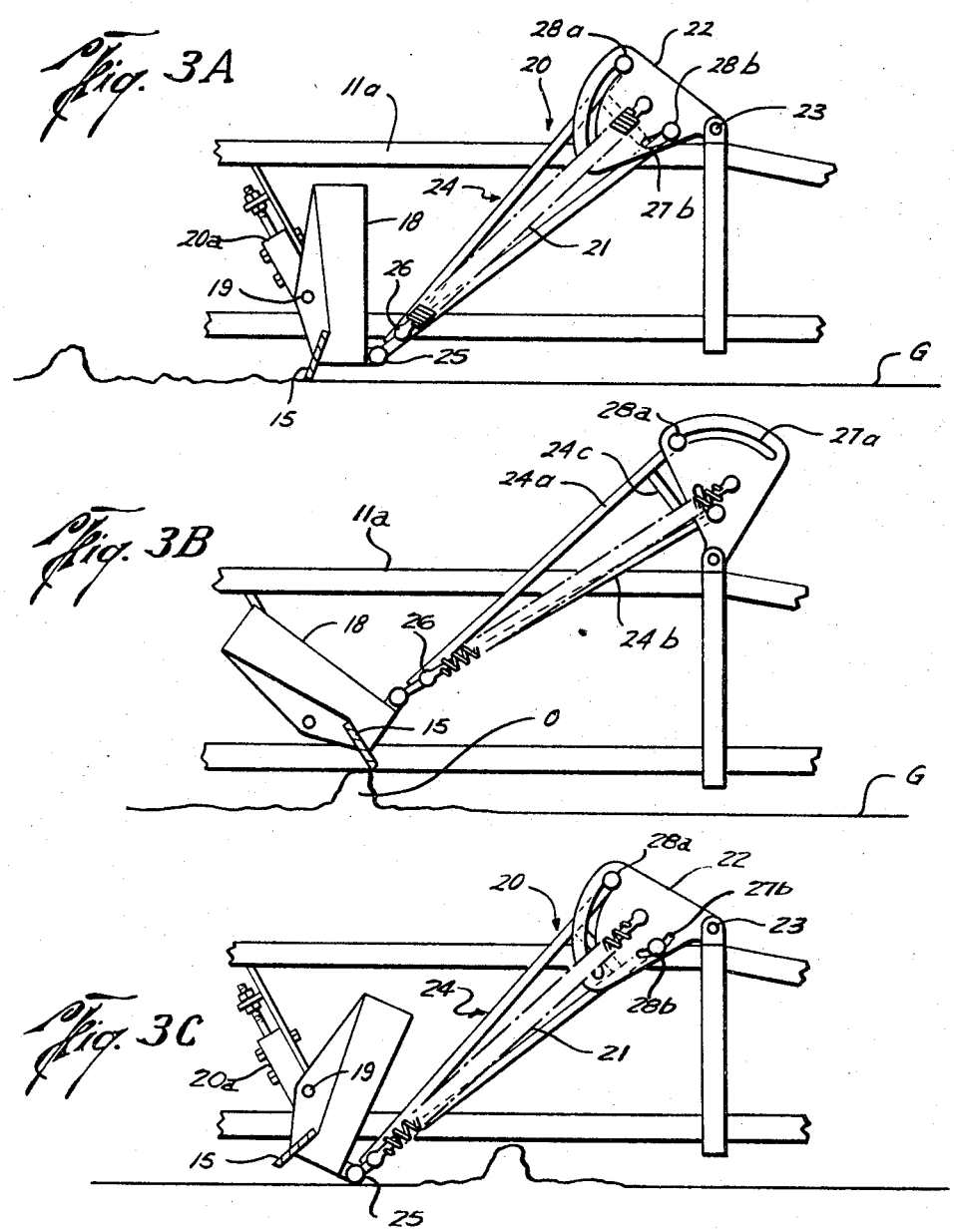

3,452,827
GROUND WORKING EQUIPMENT
Eldon J. Reynolds, McAllen, Tex., assignor to Reynolds Research & Manufacturing Corp., McAllen, Tex.
Filed Mar. 29, 1966, Ser. No. 538,404
Int. Cl. A01b 65/06, 63/00; E02f 3/16
U.S. Cl. 172—705       5 Claims

ABSTRACT OF THE DISCLOSURE

Ground working equipment having a frame which moves longitudinally over the ground level and a blade assembly including a ground working part pivotally mounted on the frame for swinging about a transverse axis between an active ground working position and a tripped position upwardly and rearwardly of its active position. An arm pivotally mounted on the frame for swinging about an axis parallel to the pivotal axis of the ground working part has a pair of curved slots in it, and a beam assembly pivotally connected to the blade assembly includes a first beam having a pin guidably slidable in a first of the slots and a second beam having a pin guidably slidable in the second slot. A spring acts between the blade assembly and arm to urge the ends of the slots into engagement with the pins to transmit the force of the spring to the ground working part in order to hold it in its ground working position. One slot is curved to move over the pin in response to swinging of the ground working part from active to tripped position, and the other slot is curved to permit it to move over its pin as the ground working part swings from active to override position. The length of the spring is changed upon swinging of the ground working part from its active to either its tripped or override positions so as to store energy therein for automatically returning the ground working part to its active position.

---

This invention relates to ground working equipment, such as a leveler, cultivator, plow or the like, having a ground working part, such as a blade, shoe, chisel or the like, adapted to be released from an active ground working position to a tripped position for passing over an obstruction when such obstruction provides predetermined resistance to working. This, of course, prevents the ground working part in particular, and the equipment in general, from being damaged by such obstruction. More particularly, this invention relates to improvements in equipment of this type in which the ground working part is automatically returned to and held in active position upon passing over the obstruction.

Generally speaking, prior devices of this latter type have been of complicated and expensive construction, and it is an object of this invention to provide an extremely simplified automatic trip mechanism. A more particular object is to provide such a mechanism having a novel arrangement for returning the ground working part from its tripped to its active position by means of the source of energy which is used in holding the ground working part in its active position.

One difficulty with conventional automatic trip mechanisms is damage due to shock to the equipment resulting from the momentum of the returning ground working part. It is therefore another object of this invention to provide such equipment in which this shock is absorbed upon return of the part to its active position; and, more particularly, in which this shock is absorbed by means of the same source of energy used in holding as well as resetting such ground working part in active position, thereby enabling a trip assembly of compact and inexpensive construction.

In the drawings wherein like reference characters are used throughout to designate like parts:

FIG. 1 is a side view of a land leveler having a ground working blade disposed thereacross which is held in active ground working position by means of a trip assembly constructed in accordance with the present invention;

FIG. 2 is a top plan view of part of the leveler, on an enlarged scale and as seen from the position indicated by the broken line 2—2 of FIG. 1; and FIGS. 3A, 3B and 3C are longitudinal sectional views of the portion of the leveler shown in FIG. 2, FIG. 3A showing the blade in active position, FIG. 3B showing it in tripped position, and FIG. 3C showing it in an override position forwardly of its active position.

With reference now to the details of the above-described drawings, and particularly FIG. 1 thereof, the land leveler 10 comprises an elongate frame 11 adapted to be moved over the ground level G in a forward direction (from right to left as indicated by the arrow). The frame may be pulled forwardly by means of drawbar 12 attached to any suitable vehicle (not shown). As illustrated, the frame is braced by means of longitudinally spaced apart uprights, and it will be understood that additional cross bracing may be provided as desired.

A plurality of laterally extending blades 13, 14, 15 and 16 are mounted on the bottom of the frame 11 for smoothing the ground during movement thereover. The forward blades 13 and 14 as well as the rear blade 16 tilt rearwardly from their upper to their lower edges, while the intermediate blade 15 tilts forwardly from its upper to its lower end. A wheel 17, which is shown by broken lines in FIG. 1 for purposes of clarity, may be disposed at each side of the frame and connected thereto in the manner described in U.S. Patent No. 3,110,973, issued to A. G. Reynolds on Nov. 19, 1963. Among other things and as described in such earlier patent, this connection enables the blades to be raised relative to the wheels for transport purposes.

It should be understood, however, that the trip assembly to be described may be used in connection with other types of ground working equipment having ground working parts susceptible of becoming hung up upon obstructions, such as tree stumps, large rocks, or the like. Thus, although the trip assembly illustrated in FIGS. 1 to 4 is used in connection with the forwardly tilting blade 15, the need for it may also be found in connection with plows, cultivators and other types of ground working equipment having parts with this same tendency to be damaged by such obstructions in the absence of some means for releasing them from active position to a tripped position in which they are free to move over the obstruction.

The blade 15 forms part of a blade assembly including a laterally extending support member 18 having a flange at each side mounting a pin 19 for pivotally connecting it to side frame members 11a and 11b to permit swinging of the blade assembly, and thus the blade 15, about a transverse axis. More particularly, the pivot pins are carried within vertically adjustable brackets 20a mounted between the top and bottom of each side frame member, whereby the elevation of the lower blade 15 may be adjusted.

In the active ground working position of the blade, in which its lower edge is at ground level G, as shown in FIG. 3A, the blade assembly support 18 is disposed substantially upright. In the tripped or released position of the blade assembly, it has swung in a counterclockwise direction so that, as shown in FIG. 3B, the lower edge of blade 15 is raised above ground level for passing over an obstruction O. In the position shown in FIG. 3C, the blade assembly has swung in a clockwise direction from its tripped position and through its active position shown in FIG. 3A to an override position forwardly of its active position. As will be described to follow, the shock due to momentum of the blade in returning from its tripped to its active position is absorbed during swinging of the blade assembly into this third position, after which the blade assembly returns to the active position of FIG. 3A.

There are preferably a pair of trip assemblies 20 connecting the blade assembly to the frame 11, one disposed adjacent each side of the frame, as shown in FIG. 2. However, a single assembly may be found to be sufficient, in which case it would normally be arranged centrally of the sides of the frame. In any case, since the trip assemblies are identical, only one need be described.

Basically, the trip assembly comprises one or more tension coil springs 21 anchored at one end to the blade assembly for extension generally upwardly and rearwardly therefrom and means including linkage connecting the blade assembly to the frame and anchoring the opposite end of the spring. More particularly, this linkage includes an arm 22 made up of spaced and interconnected plates and pivotally connected at 23 to an upper portion of the frame, and a beam assembly 24 pivotally connected at one end to the blade assembly 18 at 25 and extending upwardly and rearwardly therefrom and generally parallel to spring 21 to its opposite end, which has a lost connection with the arm. More particularly, the pivotal connections 23 and 25 enable the arm 22 and beam assembly 24, respectively, to swing about a transverse axis parallel to the pivotal axis of the blade assembly.

As shown in FIG. 2, there are two springs 21 for each trip assembly, one disposed on each side of the beam assembly 24, although one may be found sufficient. More particularly, the lower forward end of each spring is pivotally connected at 26 to the beam assembly, relatively near to the blade assembly 18. This, of course, causes the adjacent ends of the beam assembly and spring to move together during swinging of the blade assembly between the three positions shown in FIGS. 3A-3C. It will be understood, however, that although in this particular embodiment of the invention, each spring is anchored to the blade assembly through its pivotal connection to the beam assembly, it may be instead connected directly to the blade assembly, either along the pivotal axis 25 of the beam assembly or along some other axis closely adjacent to the pivotal axis 25.

Each beam assembly 24 includes an upper beam 24a and a lower beam 24b which, as best shown in FIGS. 3A-3C, diverge from their pivotal connection 25 at one end for connection by brace 24c toward their opposite ends, which are then received between the spaced plates of the arm. The lost motion connection between the beam assembly and the arm 22 comprises a slot 27a in each arm plate curved about an axis near the right hand end of a shorter slot 27b in each arm plate, which in turn is curved about an axis near the right hand end of the slot 27a, and pins 28a and 28b projecting from the opposite sides of the ends of beams 24a and 24b, respectively, for guidably sliding within the slots 27a and 27b.

In the active position of the blade assembly shown in FIG. 3A, the springs 21 force the arm 22 into a pivotal position in which the outer ends of the slots 27a and 27b bear, respectively, upon the pins 28a and 28b, the center of pin 28a coinciding with the axis about which slot 27b is curved. At this time, the springs are extended a minimum amount so that the trip assembly is in a static condition, with the beam assembly transmitting the force of the springs to the blade assembly to normally hold it in its active position.

However, when the blade 15 strikes an obstruction O which offers a resistance greater than the force due to the spring 21, the blade assembly swings in a counterclockwise direction to its tripped position, as shown in FIG. 3B. More particularly, the blade is forced in this direction and about pivot pins 19 by the obstruction O, and this force is transmitted to the arm 22 through beam 24b so as to swing the arm 22 clockwise into the position shown in FIG. 3B. That is the pin 28b on the beam 24b maintains its engagement with the rear end or slot 27b. As can be seen from comparing FIGS. 3A and 3B, however, the rear end of the spring 21 is swung in a greater arc than is the beam 24b, so that the spring 21 is stretched into a position to store energy therein. When the spring has stretched a maximum amount, the opposite end of the slot 27a moves into engagement with pin 28a on beam 24a, as shown in FIG. 3A When the blade assembly is thus tripped so as to pass over the obstruction O, the energy stored in the stretched spring 21 will urge the arm 22 in a counterclockwise direction until the opposite end of the slot 27a moves back into engagement with the pin 28a on beam 24a. At this instant, the blade assembly has returned to the active position shown in FIG. 3A and the spring 21 has returned to its state of minimum extension. However, the downwardly and forwardly swinging blade assembly 18 has considerable momentum which, if not absorbed, could damage the blade assembly as well as other parts of the equipment. This would be true, for example, if the blade assembly were swung downwardly against a stop or some other means for resetting it in its active position.

In accordance with the present invention, however, the blade assembly is free to swing in a clockwise direction to an override position (FIG. 3C) forwardly of the active position. This is made possible by the slot 27b, which enables the beam assembly to be pulled downwardly and forwardly by the blade assembly. Thus, as shown in FIG. 3C, springs 21 hold the end of slot 27a against pin 28a, so that the pin 28b on the beam 24b is free to move in the slot 27b toward the opposite end thereof. Since the pin 28b swings in a greater arc about the center of pin 28a than do the adjacent ends of the springs, such springs are again stretched to store energy therein, the maximum extent of which is determined by engagement of pin 28b with the forward end of slot 27b. This energy thus serves to absorb the shock of the return of the blade assembly to its active position and then automatically return it to such position as the spring assumes its minimum degree of extension.

From the foregoing, it will be seen that this invention is one well adapted to attain all of the ends and objects herein above set forth, together with other advantages which are obvious and which are inherent to the article.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Ground working equipment, comprising a frame movable longitudinally over the ground level, a blade assembly including a ground working part pivotally mounted on the frame for swinging about a transverse axis between an active ground working position and a tripped position in which it is disposed upwardly and rearwardly of its active position for passing over obstructions which it encounters in moving forwardly over the ground level, an arm pivotally mounted on the frame for swinging about an axis parallel to the pivotal axis of the ground working part, a slot in the arm, a beam assembly pivotally connected to said blade assembly and including a first beam having a pin guidably slidable within said slot and a second beam pivotally connected to said arm, and a spring acting between said blade assembly and arm to transmit the force of said spring to said ground working part for holding said part in its ground working position, said slot being curved to permit it to move over the pin as said beam assembly forces said arm to swing about its pivotal axis in response to swinging of said part from active to tripped position upon encountering an obstruction having sufficient resistance to overcome the force of said spring, and the length of said spring being changed upon swinging of said part from its active position to its tripped position so as to store energy therein for automatically returning said part to said active position.

2. Equipment of the character defined in claim 1, wherein said ground working part is also swingable to an override position forwardly of its active position, and wherein the pivotal connection of the second beam to the arm comprises a pin on the second beam guidably slidable within a second slot in the arm which is curved about the axis of the pin on said first beam when engaged with one end of the first mentioned slot, the ends of said slots being urged by said spring into engagement with said pins when said blade assembly is in said working position so that said second slot is free to move over the pin on said second beam to permit said part to swing from said active position to said override position, the length of spring being changed upon swinging of said part from its active to its override position so as to store energy therein for automatically returning said part to said active position.

3. Ground working equipment, comprising a frame movable longitudinally over the ground level, a ground working part pivotally mounted on the frame for swinging about a transverse axis between an active ground working position, a tripped position in which it is disposed upwardly and rearwardly of its active position for passing over obstructions which it encounters in moving forwardly over the ground level, and an override position forwardly of its active position, an arm pivotally mounted on the frame for swinging about an axis parallel to the pivotal axis of the ground working part, a spring acting between the ground working part and arm, and a beam assembly pivotally connected to said part, means connecting said beam assembly with said arm for transmitting the force of said spring to said ground working part so as to hold the part in said active position until said part encounters an obstruction sufficient to overcome said spring and then changing the length of said spring, as the ground working part swings from its active to its tripped position, so as to store energy therein for automatically returning said part from said tripped to said active position, and also changing the length of said spring, as said part swings from its active to its override position, upon return of said part to said active position, so as to store energy therein for automatically returning said part from said override to said active position.

4. Ground working equipment, comprising a frame movable longitudinally over the ground level, a ground working part mounted on the frame for movement between an active ground working position, a tripped position in which it is disposed upwardly and rearwardly of its active position for passing over obstructions which it encounters in moving forwardly over the ground level, and an override position forwardly beyond its active position, and means for holding said part in its active position until it encounters and obstruction having predetermined resistance and then releasing said part for movement from its active to its tripped position, and from its active to its override position, upon return of said part to said active position, said holding means including prestressed resilient means, and means connecting the opposite ends of the prestressed resilient means between the frame and part to provide an initial preloading force which must be overcome by said predetermined resistance before said part is released, and to cause energy to be stored in said resilient means as said part moves from its active to its tripped position and from its active to its override position so as to automatically return said part to its active position after said obstruction has been passed.

5. Ground working equipment of the character defined in claim 4, wherein said prestressed resilient means includes at least one tension spring.

References Cited

UNITED STATES PATENTS

| | | | |
|---|---|---|---|
| 1,478,436 | 12/1923 | Jackoboice | 172—794 |
| 1,483,246 | 2/1924 | Root. | |
| 1,502,832 | 7/1924 | Kirtlan | 172—710 |
| 1,876,867 | 9/1932 | Dean | 37—143 |
| 2,697,289 | 12/1954 | Standfuss | 37—143 X |
| 2,814,891 | 12/1957 | Puckett | 37—179 X |

ANTONIO F. GUIDA, *Primary Examiner.*

ALAN E. KOPECKI, *Assistant Examiner.*

U.S. Cl. XR

172—794